(12) United States Patent
Zhao et al.

(10) Patent No.: US 12,238,754 B2
(45) Date of Patent: Feb. 25, 2025

(54) METHOD AND TERMINAL DEVICE FOR SIDELINK DATA TRANSMISSION

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/314,931

(22) Filed: May 7, 2021

(65) Prior Publication Data
US 2021/0266922 A1 Aug. 26, 2021

Related U.S. Application Data

(63) Continuation of application No. PCT/CN2019/087421, filed on May 17, 2019.

(30) Foreign Application Priority Data

Nov. 8, 2018 (WO) ................ PCT/CN2018/114657

(51) Int. Cl.
*H04W 72/25* (2023.01)
*H04L 47/24* (2022.01)
(Continued)

(52) U.S. Cl.
CPC ............ *H04W 72/56* (2023.01); *H04L 47/24* (2013.01); *H04W 72/0446* (2013.01);
(Continued)

(58) Field of Classification Search
CPC ...... H04W 72/25; H04W 72/40; H04W 72/56; H04W 52/14; H04W 72/1242;
(Continued)

(56) References Cited

U.S. PATENT DOCUMENTS

2017/0367087 A1* 12/2017 Seo ................. H04W 72/51
2018/0019904 A1* 1/2018 Lee ................. H04W 56/00
(Continued)

FOREIGN PATENT DOCUMENTS

CN 106165481 A 11/2016
CN 108550318 A 3/2017
(Continued)

OTHER PUBLICATIONS

"3GPP TS 36.321 v.15.3.0", Sep. 2018, pp. 1-127 (Year: 2018).*
(Continued)

*Primary Examiner* — Salvador E Rivas
(74) *Attorney, Agent, or Firm* — Ladas & Parry LLP

(57) ABSTRACT

A method and terminal device for sidelink data transmission is provided. The method includes: when a terminal device determines, according to first configuration information, to receive a first sidelink transmission channel on a target transmission resource, and determines, according to second configuration information, to transmit a second sidelink transmission channel on the target transmission resource, receiving the first sidelink transmission channel or transmitting the second sidelink transmission channel on the target transmission resource, by the terminal device, according to a first rule. According to the method and terminal device for sidelink data transmission of the disclosure, whether to transmit or to receive data is determined according to priorities of data, or transmission modes, or allocation modes of the resource, or the like when the terminal device is configured to both transmit and receive data, so as to solve
(Continued)

200

When a terminal device determines, according to first configuration information, to receive a first sidelink transmission channel on a target transmission resource, and determines, according to second configuration information, to transmit a second sidelink transmission channel on the target transmission resource, the terminal device receives the first sidelink transmission channel or transmits the second sidelink transmission channel on the target transmission resource, according to a first rule — S210 the problem of sidelink transmission conflicts of terminal device.

13 Claims, 4 Drawing Sheets

(51) Int. Cl.
| | | |
|---|---|---|
| | *H04W 72/0446* | (2023.01) |
| | *H04W 72/40* | (2023.01) |
| | *H04W 72/56* | (2023.01) |
| | *H04W 4/46* | (2018.01) |
| | *H04W 52/14* | (2009.01) |

(52) U.S. Cl.
CPC ........... *H04W 72/25* (2023.01); *H04W 72/40* (2023.01); *H04W 4/46* (2018.02); *H04W 52/14* (2013.01)

(58) Field of Classification Search
CPC . H04W 72/1247; H04W 52/28; H04W 72/12; H04W 28/0875; H04L 47/24; H04L 5/0035; H04L 41/0896; H04L 7/0041; H04L 47/6275; H04B 17/382; H04B 17/104
See application file for complete search history.

(56) References Cited

U.S. PATENT DOCUMENTS

| | | | |
|---|---|---|---|
| 2018/0049220 A1 | 2/2018 | Patil et al. | |
| 2018/0199364 A1* | 7/2018 | Feng | H04W 4/46 |
| 2019/0075547 A1* | 3/2019 | Chae | H04W 72/02 |
| 2019/0098617 A1* | 3/2019 | Li | H04W 72/12 |
| 2019/0132832 A1* | 5/2019 | Uchiyama | H04W 4/40 |
| 2019/0246363 A1 | 8/2019 | Kim et al. | |
| 2019/0254110 A1* | 8/2019 | He | H04L 5/0048 |
| 2019/0261376 A1* | 8/2019 | Li | H04W 76/14 |
| 2019/0394786 A1* | 12/2019 | Parron | H04W 4/46 |
| 2021/0051627 A1* | 2/2021 | Lee | H04L 1/0003 |
| 2021/0112505 A1* | 4/2021 | Li | H04L 27/2607 |
| 2021/0385685 A1* | 12/2021 | Khoryaev | H04L 47/24 |

FOREIGN PATENT DOCUMENTS

| | | |
|---|---|---|
| CN | 106792885 A | 5/2017 |
| CN | 107645735 A | 1/2018 |
| CN | 108029115 A | 5/2018 |
| CN | 108370565 A | 8/2018 |
| EP | 3335495 A1 | 6/2018 |
| RU | 2599953 C2 | 10/2016 |
| RU | 2603011 C1 | 11/2016 |
| TW | 201808051 A | 3/2018 |
| WO | 2015111935 A1 | 7/2015 |
| WO | 2016076301 A1 | 5/2016 |
| WO | 2017057321 A1 | 4/2017 |
| WO | 2017128275 A1 | 8/2017 |
| WO | 2018028417 A1 | 2/2018 |

OTHER PUBLICATIONS

R1-162273, "Considerations on V2V traffic priority and relative resource allocation", Apr. 11-15, 2016, pp. 1-3 (Year: 2016).*
The international search report of PCT application No. PCT/CN2019/087421, dated Jul. 29, 2019.
The international search report of PCT application No. PCT/CN2018/114657, dated Aug. 9, 2019.
Spreadtrum Communications; "Consideration on sidelink unicast, groupcast and broadcast"; 3GPP TSG RAN WG1 Meeting #94bis, R1-1811009; Chengdu, China, Oct. 8-12, 2018; (Oct. 12, 2018).
The EESR of corresponding European application No. 19882901.2. dated Dec. 7, 2021.
Ericsson:"ProSe Group Priotities in Rel-12", 3GPP Draft; R3-142915, 3rd Generation Partnership Project (3GPP), Mobile Competence Centre; 650, Route Des Lucioles, F-06921 Sophia-Antipolis Cedex; France, vol. RAN WG3, No. San Francisco, USA; Nov. 17, 2014-Nov. 21, 2014 Nov. 17, 2014(Nov. 17, 2014), XP050878043.
Qualcomm Incorporated:"Discussion on Groupcast for NR V2X", 3GPP Draft; R2-1814929—Discussion on NR V2X Groupcast; 3rd Generation Partnership Project (3GPP), Mobile Competence Centre; 650, Route Des Lucioles; F-06921 Sophia-Antipolis Cedex; France, vol. RAN WG2, No. Chengdu, China; Oct. 8, 2018-Oct. 12, 2018 Sep. 28, 2018(Sep. 28, 2018), XP051524307.
The first Office Action of corresponding Chinese application No. 202110443233.9, dated Jan. 26, 2022.
The first Office Action of corresponding European application No. 19882901.2, dated Jul. 13, 2022.
The first Office Action of corresponding Canadian application No. 3,119,210, dated May 25, 2022.
The Notice of Allowance of corresponding Russian application No. 2021115514, dated Oct. 7, 2022.
Shashank Kumar Gupta et al. An LTE-Direct-Based Communication System for Safety Services in Vehicular Networks, Intech Open, DOI: http://dx.doi.org/10.5772/intechopen.91948, May 26, 2020, 27 pages.
The first Office Action of corresponding Indian application No. 202117024145, dated Mar. 4, 2022.
The Notice of Allowance of corresponding Japanese application No. 2021-524990, dated Oct. 17, 2023.
ZTE, SA and data transmission scheme for V2V, R1-162414, 3GPP TSG-RAN WG1 Meeting #84bis, Busan, Korea Apr. 11-15, 2016.
The EESR of corresponding European application No. 23196544.3, dated Dec. 1, 2023.
The Hearing Notice of corresponding Indian application No. 202117024145, dated Dec. 15, 2023.
The first Office Action of corresponding Japanese application No. 2021-524990, dated May 16, 2023.
The second Office Action of corresponding Canadian application No. 3,119,210, dated May 10, 2023.
The first office action of corresponding AU application No. 2019376088, dated May 30, 2024.
The first office action of corresponding Korean application No. 10-2021-7016670, dated Feb. 26, 2024.
The first office action of corresponding Mexican application No. MX/a/2021/005370, dated May 16, 2024.
Huawei, HiSilicon, Design and contents of PSCCH and PSFCH, R1-1813554, 3GPP TSG RAN WG1 Meeting #95, Spokane, USA, Nov. 12-16, 2018.
Vivo, Discussion on resource allocation mechanism for NR V2X, R1-1812309, 3GPP TSG RAN WG1 Meeting #95, Spokane, USA, Nov. 12-16, 2018.
The NOA of corresponding KR application No. 10-2021-7016670, dated Oct. 8, 2024, 2 pages.
The second Hearing Notice of corresponding IN application No. 202117024145, dated Nov. 27, 2024, 2 pages.
ZTE, In-device Coexistence between NR sidelink and LTE sidelink, R1-1808609, 3GPP TSG RAN WG1 Meeting #94, Gothenburg, Sweden, Aug. 20-24, 2018, 4 pages.
OPPO, Discussion on resource allocation in NR-V2X, R1-1808906, 3GPP TSG-RAN WG1 Meeting #94, Gothenburg, Sweden, Aug. 20-24, 2018, 4 pages.

* cited by examiner

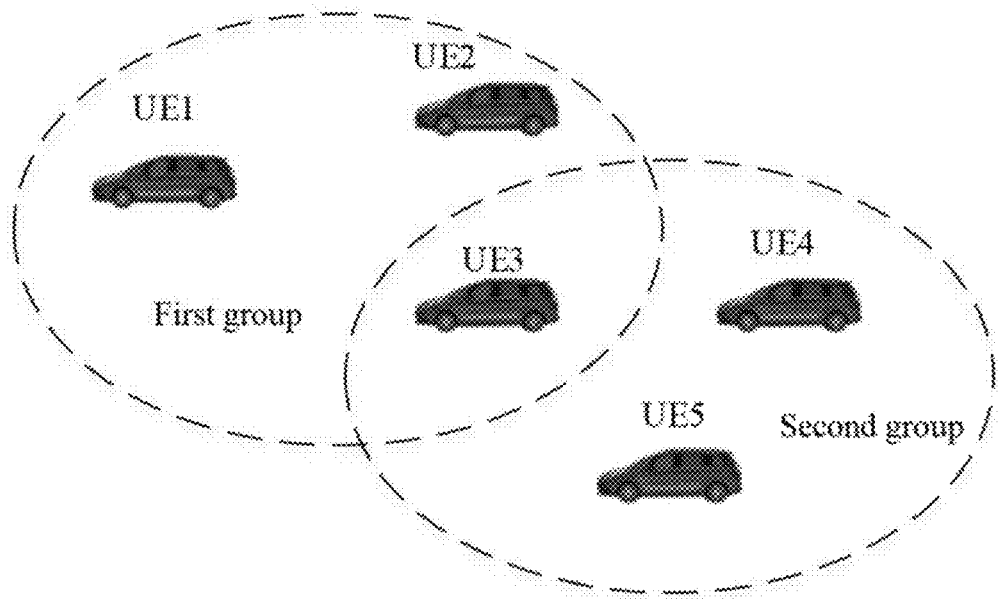

When a terminal device determines, according to first configuration information, to receive a first sidelink transmission channel on a target transmission resource, and determines, according to second configuration information, to transmit a second sidelink transmission channel on the target transmission resource, the terminal device receives the first sidelink transmission channel or transmits the second sidelink transmission channel on the target transmission resource, according to a first rule ~ S210

FIG. 4

METHOD AND TERMINAL DEVICE FOR SIDELINK DATA TRANSMISSION

CROSS-REFERENCE TO RELATED APPLICATIONS

This disclosure is a continuation of International Application No. PCT/CN2019/087421, filed on May 17, 2019, which claims priority to PCT patent application No. PCT/CN2018/114657, filed on Nov. 8, 2018, and titled "method and terminal device for sidelink data transmission". The disclosures of the aforementioned applications are hereby incorporated by reference in their entireties.

TECHNICAL FIELD

This disclosure relates to communications field and in particular, to a method and terminal device for sidelink data transmission.

BACKGROUND

A vehicle to everything system is a sidelink (Sidelink, SL) transmission technology based on long term evolution (Long Term Evolution, LTE) and device to device (Device to Device, D2D). Unlike traditional LTE systems where communication data is received or transmitted through a base station, the vehicle to everything system uses Device to Device direct communication, and thus, has higher spectral efficiency and lower transmission delay.

In vehicle to everything technology (vehicle to everything, V2X) for NR systems, there may be multiple transmission modes, such as unicast transmission, groupcast transmission and broadcast transmission. In the unicast transmission, there is only one specific terminal device at the receiving end. In the groupcast transmission, a communication group is established, and when one of terminal devices in the group transmits data, for example, a group head terminal device with functions of resource coordination, management, allocation, control and the like in the group transmits data, other terminal devices in the group are receiving terminals. In that case, the unicast transmission may be regarded as a special kind of groupcast transmission, that is, there are only two terminal devices in the group. In the broadcast transmission, a terminal device transmits data, and all the other terminal devices are receiving terminals.

Since a terminal device may participate in more than one groupcast communications or broadcast communications, a conflict will arise when the terminal device needs to receive data in a groupcast communication at a moment, and also needs to transmit data in another groupcast communication or broadcast communication at that moment.

SUMMARY

Embodiments of the present disclosure provide a method and a terminal device for sidelink data transmission, which can solve a problem of sidelink transmission conflicts of the terminal device.

In a first aspect, a method for sidelink data transmission is provided, which includes: when a terminal device determines, according to first configuration information, to receive a first sidelink transmission channel on a target transmission resource, and determines, according to second configuration information, to transmit a second sidelink transmission channel on the target transmission resource, receiving the first sidelink transmission channel or transmitting the second sidelink transmission channel on the target transmission resource, by the terminal device, according to a first rule.

In a second aspect, a terminal device is provided, which is configured to perform the method in abovementioned first aspect or various implementations thereof. Specifically, the terminal device includes a functional module for performing the method in the abovementioned first aspect or various implementations thereof.

In a third aspect, a terminal device is provided, which includes a processor and a memory. The memory is configured to store a computer program, and the processor is configured to call and run the computer program stored in the memory to perform the method in the abovementioned first aspect or various implementations thereof.

In a fourth aspect, a chip is provided for implementing the method in the abovementioned first aspect or various implementations thereof. Specifically, the chip includes: a processor, configured to call and run a computer program from a memory, to enable a device installed with the chip to perform the method in any one of the abovementioned first to second aspects or various implementations thereof.

In a fifth aspect, a computer readable storage medium is provided, which is configured to store a computer program, where the computer program enables a computer to perform the method in the abovementioned first aspect or various implementations thereof.

In a sixth aspect, a computer program product is provided, which includes computer program instructions, where the computer program instructions enable a computer to perform the method in the abovementioned first aspect or various implementations thereof.

In a seventh aspect, a computer program is provided, which, when running on a computer, enables a computer to perform the method in the abovementioned first aspect or various implementations thereof.

With the abovementioned technical solutions, for any transmission resources, when the terminal device is configured to both transmit and receive data, the transmission resource can be determined to be used for transmitting or receiving data according to priorities of to-be-transmitted data and to-be-received data, or transmission modes of the sidelink transmission, or allocation modes of the resource, or channel types, or the like, so as to solve the problem of sidelink transmission conflicts of the terminal device.

BRIEF DESCRIPTION OF DRAWINGS

FIG. 3 is a schematic diagram of groupcast communications where a terminal device according to an embodiment of the present disclosure is located;

FIG. 4 is a schematic flow diagram of a method for sidelink data transmission according to an embodiment of the present disclosure;

DESCRIPTION OF EMBODIMENTS

Technical solutions of embodiments of the present disclosure will be described below in combination with accompanying drawings of the embodiments of the present disclosure. Obviously, the described embodiments are part, rather than all, of the present disclosure. Based on the embodiments of the present disclosure, all other embodiments obtained by those skilled in the art without any creative effort shall belong to the protection scope of the present disclosure.

The technical solutions of the embodiments of the present disclosure can be applied to various communication systems, for example, a global system of mobile communication (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunication system (Universal Mobile Telecommunication System, UMTS), a worldwide interoperability for microwave access (Worldwide Interoperability for Microwave Access, WiMAX) communication system, or a 5G system, etc.

Figure 1:
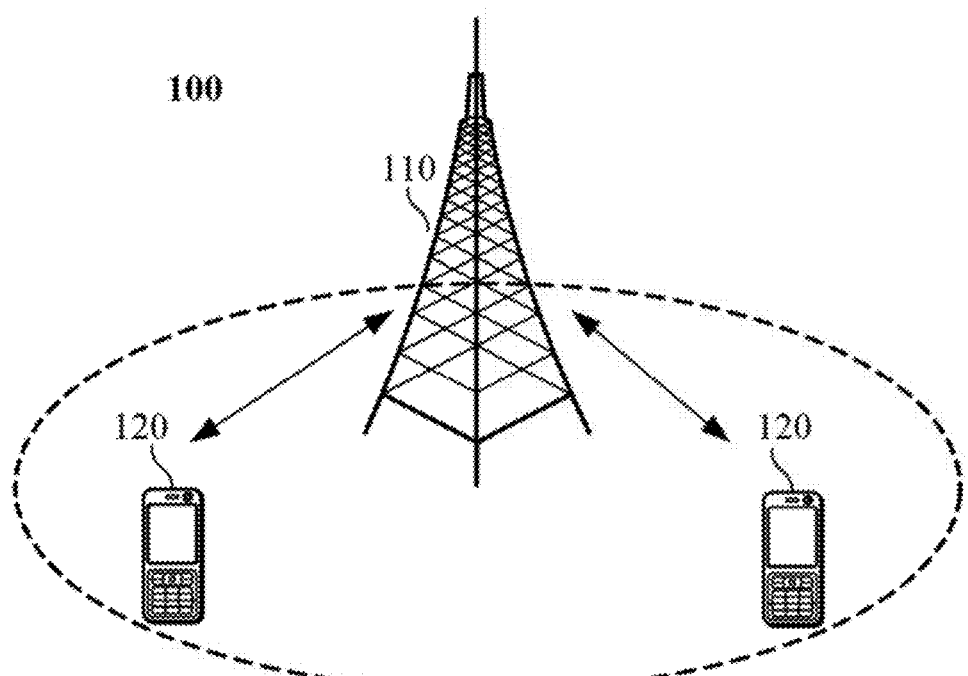
FIG. 1 is a schematic diagram of a communication system architecture according to an embodiment of the present disclosure.

Illustratively, a communication system 100 applied in the embodiments of the present disclosure is as shown in FIG. 1. The communication system 100 may include a network device 110, and the network device 110 may be a device that communicates with a terminal device 120 (or referred to as a communication terminal, a terminal). The network device 110 may provide communication coverage for a specific geographic area, and may communicate with terminal devices located within the coverage area. In an implementation, the network device 110 may be a base station (Base Transceiver Station, BTS) in a GSM system or CDMA system, or a base station (NodeB, NB) in a WCDMA system, or an evolutionary base station (Evolutional Node B, eNB or eNodeB) in an LTE system, or a wireless controller in a cloud radio access network (Cloud Radio Access Network, CRAN); or, the network device may be a mobile switching center, a relay station, an access point, an vehicle device, a wearable device, a concentrator, a switch, a network bridge, a router, a network-side device in a 5G network, a network device in a public land mobile network (Public Land Mobile Network, PLMN) evolved in the future or the like.

The communication system 100 also includes at least one terminal device 120 located within a coverage area of the network device 110. The "terminal device" used herein includes, but isn't limited to be connected via a wireline, such as via public switched telephone networks (Public Switched Telephone Networks, PSTN), a digital subscriber line (Digital Subscriber Line, DSL), a digital cable, a direct cable; and/or, another data connection/network; and/or, via a wireless interface, such as, for a cellular network, a wireless local area network (Wireless Local Area Network, WLAN), a digital television network such as a DVB-H network, a satellite network, an AM-FM radio transmitter; and/or, a device configured to receive/transmit communication signals, of another terminal device; and/or, an Internet of Things (IoT) device. A terminal device configured to communicate via a wireless interface may be referred to as a "wireless communication terminal", "wireless terminal", or "mobile terminal". Examples of mobile terminals include, but are not limited to, satellite or cellular phones; personal communications system (Personal Communications System, PCS) terminals that may combine cellular radio telephone with data processing, fax and data communication capabilities; PDAs that may include a radio telephone, a pager, an Internet/Intranet access, a Web browser, a notepad, a calendar, and/or a receiver of a global positioning system (Global Positioning System, GPS); and conventional lap-top and/or handheld receivers or other electronic devices including radio telephone transceiver. Terminal equipment may refer to an access terminal, a user equipment (User Equipment, UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld or computing device with function of wireless communication, other processing devices connecting to a wireless modem, a vehicle device, a wearable device, a terminal device in a 5G network, or a terminal device in a PLMN evolved in the future.

In an implementation, the terminal devices 120 may communicate with each other via device to device (Device to Device, D2D) communication.

In an implementation, the 5G system or 5G network may also be referred to as a new radio (New Radio, NR) system or NR network.

FIG. 1 illustratively shows one network device and two terminal devices. In an implementation, the communication system 100 may include multiple network devices, and there may be other number of terminal devices within the coverage area of each network device, which is not limited in the embodiments of the present disclosure.

In an implementation, the communication system 100 may also include other network entities, such as a network controller, a mobility management entity, or the like, which is not limited in the embodiments of the present disclosure.

It should be understood that in the embodiments of the present disclosure, a device with a communication function in the network/system may be referred to as a communication device. By taking the communication system 100 shown in FIG. 1 as an example, the communication device may include the network device 110 and the terminal device 120 that have a communication function, and the network device 110 and the terminal device 120 may be specific devices described above, which will not be repeatedly described herein. The communication device may also include other devices, for example, other network entities such as a network controller, a mobility management entity, located in the communication system 100, which is not limited in the embodiments of the present disclosure.

It should be understood that, the terms "system" and "network" are often used interchangeably herein. The term "and/or" herein is simply a description of an association relationship of associated objects, and indicates that there may be three relationships. For example, A and/or B may indicate three cases: A alone, both A and B, and B alone. In addition, the character "/" herein generally indicates that the associated objects before and after the character is in an "or" relationship.

Figure 2:
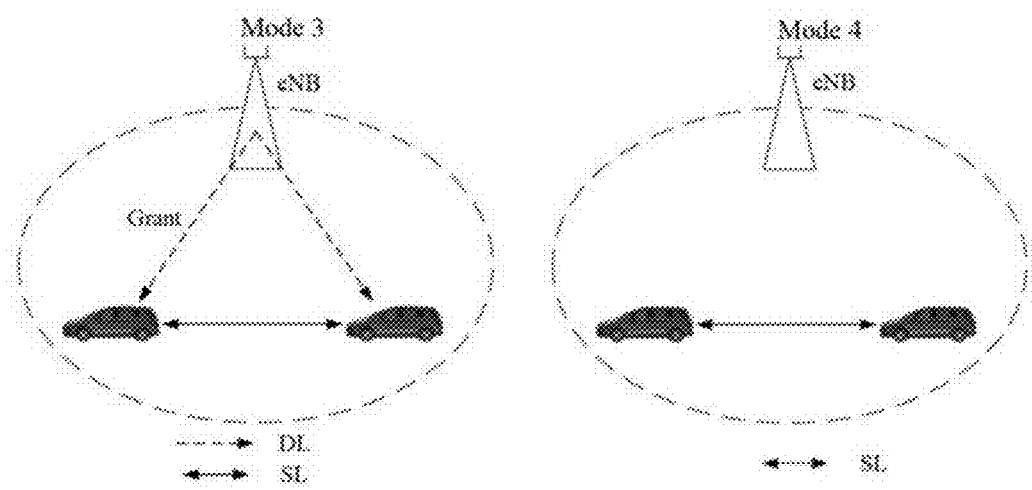
FIG. 2 is a schematic diagram of a sidelink system according to an embodiment of the present disclosure.

V2X is standardized in 3GPP version 14 (Rel-14), and two transmission modes, Mode 3 and Mode 4, are defined. FIG. 2 shows a schematic diagram of the two transmission modes in a V2X system according to an embodiment of the present disclosure.

As shown in FIG. 2, Mode 3 on the left indicates that: transmission resources of a vehicle terminal are allocated by a base station through a downlink (downlink, DL), and the vehicle terminal transmits data on a sidelink according to the resources allocated by the base station; the base station may allocate resources for a single transmission or semi-static transmission resources to the terminal.

As shown in FIG. 2. Mode 4 on the right indicates that: a vehicle terminal adopts transmission modes of sensing and reservation. The vehicle terminal obtains an available transmission resource set from a resource pool by sensing, and the terminal randomly selects a resource from the set for data transmission. Since services in the V2X system have periodic characteristics, the terminal usually adopts a mode of semi-static transmission. That is, after the terminal selects a transmission resource, it will continuously use the resource in multiple transmission cycles, so as to reduce a probability of resource reselection and resource conflict. The terminal will carry information of reserving resources for next transmission in control information of this transmission, so as to enable other terminals to determine whether the resource is reserved and used by a user by detecting the control information of the user, thereby achieving a purpose of reducing resource conflicts.

Similar to the abovementioned, multiple transmission modes, which may include, for example, Mode 1 and Mode 2, are also introduced in a NR-V2X system. In Mode 1, a network device allocates transmission resources for terminals, which is similar to Mode 3 in LTE-V2X, and the terminal devices use the transmission resources allocated by the network device, while in Mode 2, a terminal device selects transmission resources. Mode 2 further includes several sub-modes (Mode), which may specifically include, for example, the following.

(1) Mode 2a: similar to the abovementioned Mode 4 in LTE-V2X, a terminal device selects transmission resources autonomously. For example, the terminal selects resources from a pre-configured or network-configured resource pool autonomously, either by randomly selecting or by sensing.

(2) Mode 2b: a terminal assists other terminals in resource selection. For example, a first terminal transmits auxiliary information to a second terminal, and the terminal device receiving the auxiliary information may determine a transmission resource according to the auxiliary information, where the auxiliary information may include one or more pieces of the following information: available time-frequency resource information, available transmission resource set information, channel measurement information and channel quality information, such as channel state information (Channel State Information, CSI), channel quality indicator (Channel Quality Indicator, CQI), precoding matrix indicator (Precoding Matrix Indicator, PMI), rank indication (rank indication, RI), reference signal receiving power (Reference Signal Receiving Power, RSRP), received signal quality (Reference Signal Receiving Quality. RSRQ), received signal strength indicator (Received Signal Strength Indicator, RSSI), interference information and road loss information, etc.

(3) Mode 2c: a terminal device selects a resource from transmission resources configured for it. For example, a network device may configure transmission resources for each terminal in a group of terminal devices, where the transmission resources for each terminal device may be the same or different, and when any one of the terminals has sidelink data for transmission, the transmission resources configured by the network device may be used to transmit data. For example, when a network device configures the same resources for each terminal device in a group of terminal devices, a terminal device which needs to transmit sidelink data may select an available resource among the configured resources by sensing or other means; or, a network device may also configure different transmission resources for each terminal device in a group of terminal devices, and a terminal device which needs to transmit sidelink data may select an available resource from the resources configured for it.

(4) Mode 2d: a first terminal device allocates transmission resources for a second terminal device. For example, for multiple terminal devices in a groupcast link, when the first terminal device is a group head of the group of links and the second terminal device is a group member of the group, the first terminal device may directly allocate a time-frequency resource to the second terminal device for sidelink transmission.

In addition, in NR V2X, there may also be a plurality of transmission modes, such as: unicast transmission (Unicast), groupcast transmission (Groupcast), and broadcast transmission (Broadcast). In the unicast transmission, there is only one specific terminal device at the receiving end. In the groupcast transmission, a communication group is established, and when a terminal device in the group transmits data, for example, a group head terminal device with functions of resource coordination, management, allocation, control and the like in the group transmits data, all the other terminal devices in the group may be target receiving terminals. The unicast transmission may be regarded as a special kind of groupcast transmission, that is, a groupcast transmission with only two terminal devices in the group is a unicast transmission. In the broadcast transmission, a terminal device transmits data, and all the other terminal devices are target receiving terminals.

In the groupcast (or unicast) transmission, a group head may allocate transmission resources to group members. For example, a terminal device may adopt the abovementioned resource allocation method, such as Mode 2d described above, and a terminal device may participate in one or more groupcast communications. For example, by taking FIG. 3 as an example, FIG. 3 is a schematic diagram of two groupcast transmissions according to an embodiment of the present disclosure. As shown in FIG. 3, UE1, UE2, and UE3 form a first communication group, with UE1 being the group head, and UE3, UE4, and UE5 form a second communication group, with UE5 being the group head. In that case, UE3 is located in two communication groups at the same time, where in the first group, UE1 may allocate transmission resources for UE3, and in the second group. UE5 may allocate transmission resources for UE3. At a moment, when UE1 instructs UE3 to receive data at that moment, while UE5 instructs UE3 to transmit data at that moment, how does UE3 deal with it at that moment?

Or, UE3 carries out groupcast transmission in the first group, and UE3 needs to carry out broadcast transmission simultaneously, where in the groupcast transmission, UE1 allocates transmission resources for UE3, while in broadcast transmission, UE3 selects transmission resources autonomously, for example, by using Mode 2a. When UE1 instructs UE3 to receive data at a moment, while UE3 chooses that time to transmit data, how does UE3 deal with it?

Therefore, an embodiment of the present disclosure provides a method for sidelink data transmission, which can resolve the conflict that a terminal both transmits and receives data at a moment.

FIG. 4 illustrates a schematic diagram of a method 200 for sidelink data transmission according to an embodiment of the present disclosure, and the method 200 may be performed by any one of terminal devices. Specifically, the terminal device may be in sidelink communication with other terminal devices, for example, the terminal device may be any one of the terminal devices shown in FIG. 1, FIG. 2, or FIG. 3. As shown in FIG. 4, the method 200 includes: S210, when a terminal device determines, according to first configuration information, to receive a first sidelink transmission channel on a target transmission resource, and determines, according to second configuration information, to transmit a second sidelink transmission channel on the target transmission resource, the terminal device receives the first sidelink transmission channel or transmits the second sidelink transmission channel on the target transmission resource, according to a first rule.

It should be understood that, prior to S210, the method 200 also includes: the terminal device determines, according to the first configuration information, to receive the first sidelink transmission channel on the target transmission resource. Moreover, the method 200 further includes: the terminal device determines, according to the second configuration information, to transmit the second sidelink transmission channel on the target transmission resource. That is, both to-be-received data and to-be-transmitted data of sidelink are configured on the same target transmission resource, and then a resource conflict will occur.

In the embodiments of the present disclosure, the first sidelink transmission channel and the second sidelink transmission channel refer to the side link communication between the terminal device and another terminal device. Specifically, the terminal device receiving the first sidelink transmission channel on the target transmission resource includes: the terminal device receives data transmitted by another terminal device via the first sidelink transmission channel by using the target transmission resource; and the terminal device transmitting the second sidelink transmission channel on the target transmission resource includes: the terminal device transmits data to another terminal device via the second sidelink transmission channel.

In an implementation, the first sidelink transmission channel or the second sidelink transmission channel may be any one of the following channels: a physical sidelink control channel (Physical Sidelink Control Channel, PSCCH), a physical sidelink shared channel (Physical Sidelink Shared Channel, PSSCH), a physical sidelink broadcast channel (Physical Sidelink Broadcast Channel, PSBCH), and a physical sidelink feedback channel (Physical Sidelink Feedback Channel, PSFCH).

In an implementation, the method 200 of the present disclosure is applicable to sidelink transmission channels, and is also applicable to sidelink signal transmission. For example, the first sidelink transmission channel or the second sidelink transmission channel may also be replaced with a sidelink synchronization signal (Sidelink Synchronization Signal, SLSS), where the SLSS may include a sidelink-primary synchronization signal (Sidelink-Primary synchronization signal, S-PSS) and/or a sidelink-secondary synchronization signal (Sidelink-Secondary synchronization signal, S-SSS), and the embodiments of the present disclosure are not limited thereto.

It should be understood that the target transmission resource in the embodiments of the present disclosure may be a time-domain resource, or may also be a time-frequency resource. Specifically, when the target transmission resource is a time-domain resource, the terminal device determines, according to the first configuration information, to receive the first sidelink transmission channel by using the time-domain resource, and it also transmits the second sidelink transmission channel at the same time, and frequency domain resources corresponding to the first sidelink transmission channel and the second sidelink transmission channel may be the same, or may be different.

In the embodiments of the present disclosure, when a terminal device determines, according to the first configuration information and the second configuration information, that it needs to receive the first sidelink transmission channel and transmit the second sidelink transmission channel on the same target transmission resource, the terminal device may choose, according to the first rule, to receive the first sidelink transmission channel or transmit the second sidelink transmission channel on the target transmission resource. Here, the first rule may be pre-configured, for example, may be specified in a protocol; or, the first rule may also be configured for the terminal device by a network device, and the embodiments of the present disclosure are not limited thereto.

It should be understood that the first rule may include a variety of embodiments. The first rule will be exemplified and described in detail below in combination with several specific embodiments.

Embodiment 1

The first rule is that: the terminal device receives the first sidelink transmission channel or transmits the second sidelink transmission channel on the target transmission resource, according to a comparison result of first parameter information of to-be-received data on the first sidelink transmission channel and second parameter information of to-be-transmitted data on the second sidelink transmission channel.

Specifically, the terminal device may obtain the first parameter information of the to-be-received data on the first sidelink transmission channel, and may also obtain the second parameter information of the to-be-transmitted data on the second sidelink transmission channel. Here, the first parameter information may be received by the terminal device from another terminal device, and the another terminal device is a terminal device that is to transmit the first sidelink transmission channel to the terminal device.

The terminal device chooses, according to the comparison result of the first parameter information and the second parameter information, to receive the first sidelink transmission channel or to transmit the second sidelink transmission channel on that target transmission resource. Here, the comparison result of the first parameter information and the second parameter information relates to specific parameters included therein.

In an implementation, the first parameter information is priority information of the to-be-received data, and the second parameter information is priority information of the to-be-transmitted data, then the terminal device may choose, according to the comparison result of the priority information, to receive the first sidelink transmission channel or transmit the second sidelink transmission channel on the target transmission resource. Specifically, the terminal device receives the first sidelink transmission channel on the target transmission resource when a priority of the to-be-received data is higher than a priority of the to-be-transmitted data; or, the terminal device transmits the second sidelink transmission channel on the target transmission resource when a priority of the to-be-received data is lower than a priority of the to-be-transmitted data.

In an implementation, the priority information of the to-be-received data and/or the to-be-transmitted data may be carried in sidelink control information (Sidelink Control Information, SCI). For example, the priority is indicated by a ProSe per-packet priority (ProSe Per-Packet Priority, PPPP) value, and a lower PPPP value indicates a higher priority level, however, the embodiments of the present disclosure are not limited thereto.

For example, PPPP value of the to-be-received data on the first sidelink transmission channel is 1, and PPPP value of the to-be-transmitted data on the second sidelink transmission channel is 3, since a lower PPPP value indicates a higher priority, then the priority of the to-be-received data is higher than the priority of the to-be-transmitted data, and therefore, the terminal device receives the first sidelink transmission channel on the target resource.

In an implementation, as an embodiment, the first parameter information is delay information of the to-be-received data, and the second parameter information is delay information of the to-be-transmitted data; then the terminal device may compare delays according to delay requirements of the to-be-received data and the to-be-transmitted data, and thus, choose to receive the first sidelink transmission channel or transmit the second sidelink transmission channel on the target transmission resource. Specifically, the terminal device receives the first sidelink transmission channel on the target transmission resource when delay of the to-be-received data is less than delay of the to-be-transmitted data; or, the terminal device transmits the second sidelink transmission channel on the target transmission resource when delay of the to-be-received data is greater than delay of the to-be-transmitted data.

For example, the delay of the to-be-received data on the first sidelink transmission channel is required to be 10 ms, and the delay of the to-be-transmitted data on the second sidelink transmission channel is required to be 100 ms, the delay of the to-be-received data is less than the delay of the to-be-transmitted data, and a shorter delay indicates a more urgent service, and therefore, the terminal device receives the first sidelink transmission channel on the target resource.

In an implementation, as an embodiment, the first parameter information is reliability information of the to-be-received data, and the second parameter information is reliability information of the to-be-transmitted data; then the terminal device may compare reliabilities according to reliability requirements of the to-be-received data and the to-be-transmitted data, and then choose to receive the first sidelink transmission channel or transmit the second sidelink transmission channel on the target transmission resource. Specifically, the terminal device receives the first sidelink transmission channel on the target transmission resource when reliability of the to-be-received data is greater than the reliability of the to-be-transmitted data; or, the terminal device transmits the second sidelink transmission channel on the target transmission resource when reliability of the to-be-received data is less than reliability of the to-be-transmitted data.

For example, the reliability of the to-be-received data on the first sidelink transmission channel is required to be 90%, and the reliability of the to-be-transmitted data on the second sidelink transmission channel is required to be 99%; the required reliability of the to-be-received data is lower than the required reliability of the to-be-transmitted data, and therefore, the terminal device transmits the second sidelink transmission channel on the target resource.

In an implementation, the first parameter information and the second parameter information may also be other parameter information. For example, the first parameter information is quality of service (Quality of Service. QoS) information of the to-be-received data, and the second parameter is QoS information of the to-be-transmitted data, and the terminal device chooses to receive or transmit data on the target transmission resource according to QoS levels of the to-be-received data and the to-be-transmitted data. For the sake of conciseness, they are not enumerated herein.

In an implementation, each of the abovementioned embodiments is illustrated by taking each of the first parameter information and the second parameter information including one kind of information as an example; however, the first parameter information and the second parameter information may also include multiple kinds of information, and a comprehensive judgment may be made by using the multiple kinds of information. For example, both of the first parameter information and the second parameter information include priority information and delay information, and priorities may be compared first; when a priority in the first parameter information is not equal to a priority in the second parameter information, a choice may be made according to the abovementioned comparison result about the priorities to receive the first sidelink transmission channel or transmit the second sidelink transmission channel on the target transmission resource; when a priority in the first parameter information is equal to a priority in the second parameter information, the delay information in the first parameter information and the delay information in the second parameter information may be compared then, and a choice is made according to a comparison result of the delay information to receive the first sidelink transmission channel or transmit the second sidelink transmission channel on the target transmission resource. Thus, when the first parameter information and the second parameter information include multiple parameters, they may be used in combination, and the embodiments of the present disclosure are not limited thereto.

Embodiment 2

The first rule is that: the terminal device receives the first sidelink transmission channel on the target transmission resource when a priority of a transmission type of the first sidelink transmission channel is higher than a priority of a transmission type of the second sidelink transmission channel; or, the terminal device transmits the second sidelink transmission channel on the target transmission resource when a priority of a transmission type of the first sidelink transmission channel is lower than a priority of a transmission type of the second sidelink transmission channel.

In an embodiment of the present disclosure, the transmission type of the first sidelink transmission channel or the second sidelink transmission channel may be unicast transmission, groupcast transmission, or broadcast transmission, where the unicast transmission may also be regarded as a special kind of groupcast transmission. For the sake of illustration, the unicast transmission mentioned below refers to side link communication between two terminal devices, while the groupcast transmission refers to sidelink communication among three or more terminal devices.

In an embodiment of the present disclosure, the priority of the transmission type of the sidelink transmission channel may be set according to practical disclosures, or specified in a protocol, or configured according to a network. For example, generally, it may be set that priorities of the unicast transmission and the groupcast transmission are higher than that of the broadcast transmission; and priorities of the unicast transmission and the groupcast transmission may be equal or unequal, or, a priority of the unicast transmission and a priority of the groupcast transmission may be judged according to other conditions: or, it may also be set that a priority of the unicast transmission is higher or lower than a priority of the groupcast transmission, however, the embodiments of the present disclosure are not limited thereto.

Embodiment 3

The first rule is that: the terminal device receives the first sidelink transmission channel or transmits the second sidelink transmission channel on the target transmission resource, according to an allocation mode of the target transmission resource in the first configuration information and the second configuration information.

It should be understood that, there may be various allocation modes of the target transmission resource of the terminal device, for example, the abovementioned Mode 1 and Mode 2 in the NR system, where Mode 2 may also include various sub-modes such as Modes 2a-2d. The mode of the target transmission resource determined by the terminal device according to the first configuration information may be different from the mode of the target transmission resource determined according to the second configuration information, therefore, it may be chosen to receive the first sidelink transmission channel or transmit the second sidelink transmission channel on the target transmission resource according to the allocation mode of the target transmission resource.

In an implementation, in terms of different entities that allocate that target transmission resource, the allocation modes of the target transmission resource may be divided into allocated by a network device, allocated by another terminal device and allocated by the terminal device itself. Accordingly, the allocation modes of the target transmission resource in the first configuration information or the second configuration information may be any one of the following: allocated by a network device, allocated by another terminal device and allocated by the terminal device.

Specifically, the allocation mode of the target transmission resource in the first configuration information or the second configuration information being "allocated by a network device" represents that: a network device transmits the first configuration information or the second configuration information to the terminal device, where the first configuration information or the second configuration information may be scheduling information or resource pool configuration information transmitted by the network device. That is, the target transmission resource is allocated by the network device to the terminal device, via the first configuration information, for receiving the first sidelink transmission channel, or the target transmission resource is allocated by the network device to the terminal device, via the second configuration information, for transmitting the second sidelink transmission channel.

Similarly, the allocation mode of the target transmission resource in the first configuration information or the second configuration information being "allocated by another terminal device" represents that: another terminal device transmits the first configuration information or the second configuration information to the terminal device, where another terminal device is a terminal device different from the terminal device, and another terminal device may refer to any terminal device other than the terminal device. That is, the target transmission resource is allocated by another terminal device to the terminal device, via the first configuration information, for receiving the first sidelink transmission channel, or the target transmission resource is allocated by other terminal device to the terminal device, via the second configuration information, for transmitting the second sidelink transmission channel.

The allocation mode of the target transmission resource in the first configuration information or the second configuration information being "allocated by the terminal device itself" represents that the first configuration information or the second configuration information is determined by the terminal device itself, that is, the terminal device determines the first configuration information, and determines that the target transmission resource is used to receive the first sidelink transmission channel; or, the terminal device determines the second configuration information, and determines that the target transmission resource is used to transmit the second configuration information, where the first configuration information or the second configuration information may come from a high layer of the terminal device, such as an disclosure layer, or a radio link control layer, or a media access control layer.

It should be understood that different resource allocation modes may correspond to different priorities. For example, generally, the resource allocation mode of "allocated by a network device" may be set to have the highest priority. For example, the priority of the abovementioned Mode 1 is greater than the priority of Mode 2, assuming that the terminal device adopts Mode 1 to determine to receive the first sidelink transmission channel on the target transmission resource according to the first configuration information, and adopts Mode 2 (any one of the abovementioned Mode 2, e.g., Mode 2a in Mode 2) to determine to transmit the second sidelink transmission channel on the target transmission resource according to the second configuration information, since the priority of Mode 1 is greater than the priority of Mode 2, the terminal device chooses to receive the first sidelink transmission channel on the target transmission resource. In addition, the priorities of "allocated by another terminal device" and "allocated by the terminal device itself" may be the same, or may also be different. For example, the priority of a resource allocation mode of another terminal device allocating resource may also be set higher than the priority of a resource allocation mode of the terminal device itself allocating resource, for example, the priority of the abovementioned Mode 2d or Mode 2b is greater than the priority of the Mode 2a; however, the embodiments of the present disclosure are not limited thereto.

For example, when the target transmission resource in the first configuration information is allocated by a network device and the target transmission resource in the second configuration information is allocated by the another terminal device or allocated by the terminal device itself, the terminal device may receive the first sidelink transmission channel in priority, that is, receive the first sidelink transmission channel on the target transmission resource; or, when the target transmission resource in the first configuration information is allocated by another terminal device or allocated by the terminal device itself, and the target transmission resource in the second configuration information is allocated by a network device, the terminal device may transmit the second sidelink transmission channel in priority, that is, transmit the second sidelink transmission channel on the target transmission resource.

for another example, when the target transmission resource in the first configuration information is allocated by another terminal device and the target transmission resource in the second configuration information is allocated by the terminal device itself, the terminal device may receive the first sidelink transmission channel in priority, that is, receive the first sidelink transmission channel on the target transmission resource; or, when the target transmission resource in the first configuration information is allocated by the terminal device itself and the target transmission resource in the second configuration information is allocated by another terminal device, the terminal device may transmit the second sidelink transmission channel in priority, that is, transmit the second sidelink transmission channel on the target transmission resource.

In an implementation, the priorities of various resource allocation modes may be determined by pre-configuration, protocol specification, or network configuration.

Embodiment 4

The first rule is that: the terminal device receives the first sidelink transmission channel or transmits the second sidelink transmission channel on the target transmission resource, according to types of the first sidelink transmission channel and the second sidelink transmission channel.

In an embodiment of the present disclosure, the type of the first sidelink transmission channel or the second sidelink transmission channel may be any one of the following: PSCCH, PSSCH, PSBCH and PSFCH, and a priority order of these four channels may be set according to practical disclosures, or according to pre-configuration information, or according to network configuration information. For example, priorities of PSCCH and PSSCH may be set to be lower than that of PSBCH and PSFCH.

Specifically, when the first sidelink transmission channel is a PSBCH or a PSFCH and the second sidelink transmission channel is a PSCCH or a PSSCH, the terminal device receives the first sidelink transmission channel in priority, that is, receives the first sidelink transmission channel on the target transmission resource; or, when the first sidelink transmission channel is a PSCCH or a PSSCH and the second sidelink transmission channel is a PSBCH or a PSFCH, the terminal device transmits the second sidelink transmission channel in priority, that is, transmits the second sidelink transmission channel on the target transmission resource.

Embodiment 5

According to the description of Embodiment 4, the first sidelink transmission channel and the second sidelink transmission channel may have different types, considering several special cases, for example, when the first sidelink transmission channel and/or the second sidelink transmission channel is a PSFCH, the first rule may also include: determining to receive the first sidelink transmission channel or transmit the second sidelink transmission channel on the target transmission resource according to parameter information of sidelink data for which the feedback information carried by a PSFCH channel is provided.

Specifically, a case may be that: the first sidelink transmission channel is a first PSFCH for first sidelink data, and the second sidelink transmission channel is a second PSFCH for second sidelink data; and another case may be that: the first sidelink transmission channel is a first PSFCH for first sidelink data, and the second sidelink transmission channel is a channel used to transmit second sidelink data; or, yet another of the cases may be that: the first sidelink transmission channel is a channel used to receive first sidelink data, and the second sidelink transmission channel is a second PSFCH for second sidelink data.

For any one of the abovementioned cases, the first rule may include: the terminal device receives the first sidelink transmission channel or transmits the second sidelink transmission channel on the target transmission resource, according to a comparison result of parameter information of the first sidelink data and parameter information of the second sidelink data.

In an implementation, the parameter information of the first sidelink data may be at least one piece of the following information of the first sidelink data: priority information, reliability information and delay information, and correspondingly, the parameter information of the second sidelink data may be at least one piece of the following information of the second sidelink data: priority information, reliability information and delay information.

For example, the parameter information of the first sidelink data is priority information of the first sidelink data, and the parameter information of the second sidelink data is priority information of the second sidelink data, then the first rule may be: the terminal device receives the first sidelink transmission channel on the target transmission resource when a priority of the first sidelink data is higher than a priority of the second sidelink data; or, the terminal device transmits the second sidelink transmission channel on the target transmission resource when a priority of the first sidelink data is lower than a priority of the second sidelink data.

In an implementation, for the case that the first sidelink transmission channel received by the terminal device is a channel for the first sidelink data, the parameter information of the first sidelink data may be carried by an SCI, that is, the parameter information of the first sidelink data may be included in an SCI that is configured to schedule the first sidelink data and that is received by the terminal device from another terminal device.

Similarly, for the case that the second sidelink transmission channel transmitted by the terminal device is the second PSFCH for the second sidelink data, the parameter information of the second sidelink data may also be carried by an SCI, and the SCI is configured to schedule the second sidelink data. That is, the parameter information of the second sidelink data may be included in an SCI that is configured to schedule the second sidelink data and that is transmitted from another terminal device to the terminal device before the terminal device transmits the second PSFCH for the second sidelink data to the another terminal device.

It should be understood that the abovementioned five embodiments of the first rule may be used separately and independently, or multiple embodiments therein may be used in combination, or one or more embodiments therein may be used in combination with other methods. For example, when the comparison result of the first parameter information and the second parameter information in Embodiment 1 is used for selection, when the comparison result of the two parameter information is the same, it may not be determined whether to receive the first sidelink transmission channel or to transmit the second sidelink transmission channel on the target transmission resource, and in that case, other method may be used to make a judgment again, for example, the method of Embodiment 2 is further used for judgement, until it can be judged whether to receive the first sidelink transmission channel or transmit the second sidelink transmission channel on that target transmission resource.

In the embodiments of the present disclosure, assuming that the terminal device needs to receive a first sidelink transmission channel transmitted by a first terminal device at the target transmission resource, and transmit the second sidelink transmission channel to a second terminal device, since a conflict will occur, the terminal device finally chooses to receive the first sidelink transmission channel or transmit the second sidelink transmission channel on the target transmission resource according to the first rule. Accordingly, for a final judgment result of the terminal device, the first terminal device and the second terminal device may obtain the judgment result, and determine that the first terminal device transmits the first sidelink transmission channel on the target transmission resource, or the second terminal device receives the second sidelink transmission channel on the target transmission resource. Here, the first terminal device and the second terminal device may be any terminal device, and they may be the same or different terminal devices, the embodiments of the present disclosure are not limited thereto.

Therefore, in the method for sidelink data transmission according to the embodiments of the present disclosure, for any transmission resources, when the terminal device is configured to both transmit and receive data, it can determine to use the transmission resource to transmit or receive data according to the priorities of the to-be-transmitted data and the to-be-received data, or the transmission modes of sidelink transmission, or the allocation modes of the resource, or the channel types, or the like, so as to solve the problem of sidelink transmission conflicts of the terminal device.

It should be understood that in various embodiments of the present disclosure, a serial number of each of the abovementioned processes does not imply an order of execution, and the order of execution of the processes shall be determined by function and inherent logic thereof, and shall not constitute any limitation to implementation processes of the embodiments of the present disclosure.

In addition, the term "and/or" herein is simply a description of an association relationship of associated objects, and indicates that there may be three relationships. For example, A and/or B may indicate three cases: A alone, both A and B, and B alone. In addition, the character "/" herein generally indicates that the associated objects before and after the character is in an "or" relationship.

The methods for sidelink data transmission according to the embodiments of the present disclosure have been described above in detail in combination with FIGS. 1 to 4. The terminal devices according to the embodiments of the present disclosure will be described below in combination with FIGS. 5 to 8.

Figure 5:
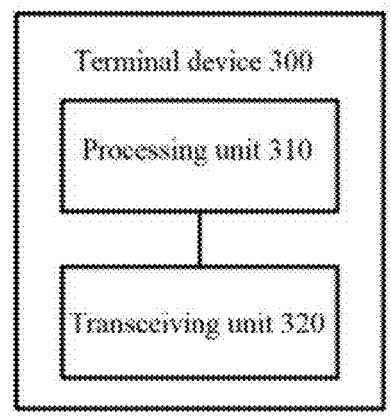
FIG. 5 is a schematic block diagram of a terminal device according to an embodiment of the present disclosure.

As shown in FIG. 5, the terminal device 300 according to an embodiment of the present disclosure includes: a processing unit 310 and a transceiving unit 320. Specifically, the transceiving unit 320 is configured to: receive a first sidelink transmission channel or transmit a second sidelink transmission channel on a target transmission resource according to a first rule when the processing unit 310 determines, according to first configuration information, to receive the first sidelink transmission channel on the target transmission resource, and determines, according to the second configuration information, to transmit the second sidelink transmission channel on the target transmission resource.

In an implementation, as an embodiment, the target transmission resource is a time-domain resource.

In an implementation, as an embodiment, the first rule is that: the transceiving unit 320 receives the first sidelink transmission channel or transmits the second sidelink transmission channel on the target transmission resource, according to a comparison result of first parameter information of to-be-received data on the first sidelink transmission channel and second parameter information of to-be-transmitted data on the second sidelink transmission channel.

In an implementation, as an embodiment, the first parameter information is priority information of the to-be-received data, and the second parameter information is priority information of the to-be-transmitted data, and the transceiving unit 320 is further configured to: receive the first sidelink transmission channel on the target transmission resource when a priority of the to-be-received data is higher than a priority of the to-be-transmitted data; or, transmit the second sidelink transmission channel on the target transmission resource when a priority of the to-be-received data is lower than a priority of the to-be-transmitted data.

In an implementation, as an embodiment, the first parameter information is delay information of the to-be-received data, and the second parameter information is delay information of the to-be-transmitted data; the transceiving unit 320 is further configured to: receive the first sidelink transmission channel on the target transmission resource when delay of the to-be-received data is less than delay of the to-be-transmitted data; or, transmit the second sidelink transmission channel on the target transmission resource when delay of the to-be-received data is greater than delay of the to-be-transmitted data.

In an implementation, as an embodiment, the first parameter information is reliability information of the to-be-received data, and the second parameter information is reliability information of the to-be-transmitted data: the transceiving unit 320 is further configured to: receive the first sidelink transmission channel on the target transmission resource when reliability of the to-be-received data is greater than the reliability of the to-be-transmitted data; or, transmit the second sidelink transmission channel on the target transmission resource when reliability of the to-be-received data is less than reliability of the to-be-transmitted data.

In an implementation, as an embodiment, the first rule is that: the transceiving unit 320 receives the first sidelink transmission channel on the target transmission resource when a priority of a transmission type of the first sidelink transmission channel is higher than a priority of a transmission type of the second sidelink transmission channel; or, the transceiving unit 320 transmits the second sidelink transmission channel on the target transmission resource when a priority of a transmission type of the first sidelink transmission channel is lower than a priority of a transmission type of the second sidelink transmission channel.

In an implementation, as an embodiment, the transmission type of the first sidelink transmission channel is unicast transmission, groupcast transmission, or broadcast transmission; and the transmission type of the second sidelink transmission channel is unicast transmission, groupcast transmission, or broadcast transmission.

In an implementation, as an embodiment, a priority of the unicast transmission and a priority of the groupcast transmission are both higher than a priority of the broadcast transmission.

In an implementation, as an embodiment, a priority of the unicast transmission is higher or lower than a priority of the groupcast transmission.

In an implementation, as an embodiment, the first rule is that: the transceiving unit 320 receives the first sidelink transmission channel or transmits the second sidelink transmission channel on the target transmission resource, according to an allocation mode of the target transmission resource in the first configuration information and the second configuration information.

In an implementation, as an embodiment, the allocation mode of the target transmission resource includes at least one of the following: allocated by a network device, allocated by another terminal device and allocated by the terminal device 30).

In an implementation, as an embodiment, the transceiving unit 320 is further configured to: receive the first sidelink transmission channel on the target transmission resource, when the target transmission resource in the first configuration information is allocated by a network device and the target transmission resource in the second configuration information is allocated by the another terminal device or allocated by the terminal device 300; or, transmit the second sidelink transmission channel on the target transmission resource when the target transmission resource in the first configuration information is allocated by the another terminal device or allocated by the terminal device 300 and the target transmission resource in the second configuration information is allocated by a network device.

In an implementation, as an embodiment, the transceiving unit 320 is further configured to: receive the first sidelink transmission channel on the target transmission resource when the target transmission resource in the first configuration information is allocated by the another terminal device and the target transmission resource in the second configuration information is allocated by the terminal device 300; or, transmit the second sidelink transmission channel on the target transmission resource when the target transmission resource in the first configuration information is allocated by the terminal device 300 and the target transmission resource in the second configuration information is allocated by the another terminal device.

In an implementation, as an embodiment, the first rule is that: the transceiving unit 320 receives the first sidelink transmission channel or transmits the second sidelink transmission channel on the target transmission resource, according to types of the first sidelink transmission channel and the second sidelink transmission channel.

In an implementation, as an embodiment, the transceiving unit 320 is further configured to: receive the first sidelink transmission channel on the target transmission resource when the first sidelink transmission channel is a PSBCH or a PSFCH and the second sidelink transmission channel is a PSCCH or a PSSCH; or, transmit the second sidelink transmission channel on the target transmission resource when the first sidelink transmission channel is a PSCCH or a PSSCH and the second sidelink transmission channel is a PSBCH or a PSFCH.

In an implementation, as an embodiment, the type of the first sidelink transmission channel or the type of the second sidelink transmission channel may be any one of the following: PSCCH, PSSCH, PSBCH and PSFCH.

In an implementation, as an embodiment, the first sidelink transmission channel is a first PSFCH for first sidelink data, and the second sidelink transmission channel is a second PSFCH for second sidelink data.

In an implementation, as an embodiment, the first sidelink transmission channel is a first PSFCH for first sidelink data, and the second sidelink transmission channel is a channel used to transmit second sidelink data.

In an implementation, as an embodiment, the first sidelink transmission channel is a channel used to receive first sidelink data, and the second sidelink transmission channel is a second PSFCH for second sidelink data.

In an implementation, as an embodiment, the first rule is that: the transceiving unit 320 receives the first sidelink transmission channel or transmits the second sidelink transmission channel on the target transmission resource, according to a comparison result of parameter information of the first sidelink data and parameter information of the second sidelink data.

In an implementation, as an embodiment, the parameter information of the first sidelink data is priority information of the first sidelink data, and the parameter information of the second sidelink data is priority information of the second sidelink data; and the first rule is that: the transceiving unit 320 receives the first sidelink transmission channel on the target transmission resource when a priority of the first sidelink data is higher than a priority of the second sidelink data; or, the transceiving unit 320 transmits the second sidelink transmission channel on the target transmission resource when a priority of the first sidelink data is lower than a priority of the second sidelink data.

It should be understood that, the terminal device 300 according to the embodiments of the present disclosure may correspondingly perform the method 200 in the embodiments of the present disclosure, and that the abovementioned and other operations and/or functions of various units in the terminal device 300 are intended to implement corresponding processes of the terminal device in each of the methods in FIGS. 1 to 4, respectively, which will not be repeated herein for the sake of conciseness.

Therefore, for any transmission resources, when the terminal device according to the embodiments of the present disclosure is configured to both transmit and receive data, the terminal device can determine to use the transmission resource to transmits or receive data according to the priorities of the to-be-transmitted data and the to-be-received data, or the transmission modes of sidelink transmission, or the allocation modes of the resource, or the channel types, or the like, so as to solve the problem of sidelink transmission conflicts of the terminal device.

Figure 6:
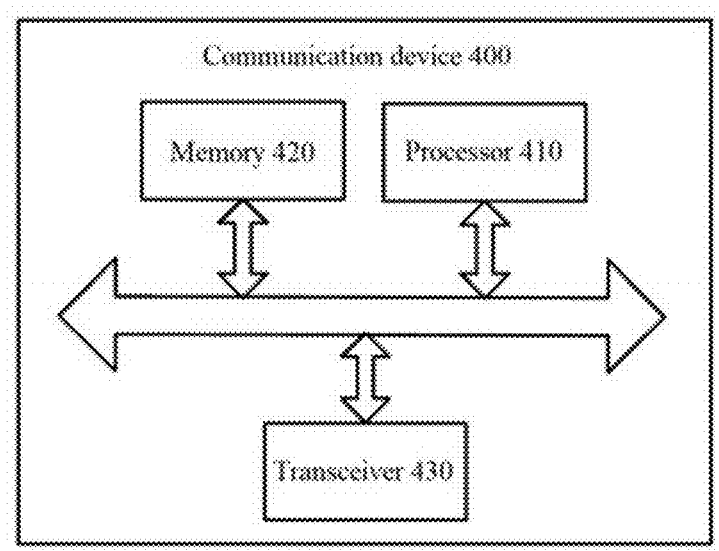
FIG. 6 is a schematic block diagram of a communication device according to an embodiment of the present disclosure.

FIG. 6 is a schematic structural diagram of a communication device 400 according to an embodiment of the present disclosure. The communication device 400 shown in FIG. 6 includes a processor 410, where the processor 410 may call and run a computer program from a memory to implement the methods in the embodiments of the present disclosure.

In an implementation, as shown in FIG. 6, the communication device 400 may further include a memory 420, where the processor 410 may call and run the computer program from the memory 420 to implement the methods in the embodiments of the present disclosure.

Here, the memory 420 may be a device separate from the processor 410, or may be integrated into the processor 410.

In an implementation, as shown in FIG. 6, the communication device 400 may also include a transceiver 430, and the processor 410 may control the transceiver 430 to communicate with another device, specifically, to transmit information or data to another device, or to receive information or data from another device.

Here, the transceiver 430 may include a transmitter and a receiver. The transceiver 430 may further include an antenna, and the number of antennas may be one or more.

In an implementation, the communication device 400 may specifically be a network device according to the embodiments of the present disclosure, and the communication device 400 may implement corresponding processes implemented by the network device in each of the methods of the embodiments of the present disclosure, which will not be repeated herein for the sake of conciseness.

In an implementation, the communication device 400 may be specifically a mobile terminal/terminal device according to the embodiments of the present disclosure, and the communication device 400 may implement the corresponding processes implemented by the mobile terminal/terminal device in each of the methods of the embodiments of the present disclosure, which will not be repeated herein for the sake of conciseness.

Figure 7:
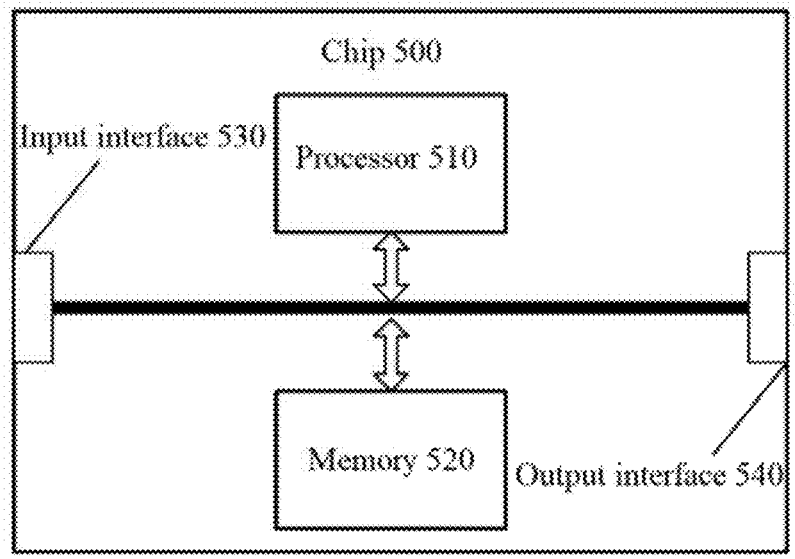
FIG. 7 is a schematic block diagram of a chip according to an embodiment of the present disclosure.

FIG. 7 is a schematic structural diagram of a chip according to an embodiment of the present disclosure. A chip 500 shown in FIG. 7 includes a processor 510, where the processor 510 may call and run a computer program to implement the methods in the embodiments of the present disclosure.

In an implementation, as shown in FIG. 7, the chip 500 may further include a memory 520, where the processor 510 may call and run a computer program to implement the methods in the embodiments of the present disclosure.

Here, the memory 520 may be a device separate from the processor 510, or may be integrated in the processor 510.

In an implementation, the chip 500 may further include an input interface 530, where the processor 510 may control the input interface 530 to communicate with another device or chip, specifically, to obtain information or data transmitted by another device or chip.

In an implementation, the chip 500 may further include an output interface 540, where the processor 510 may control the output interface 540 to communicate with another device or chip, specifically, to output information or data to another device or chip.

In an implementation, the chip may be applied to the network device in the embodiments of the present disclosure, and the chip may implement corresponding processes implemented by the network device in each of the methods of the embodiments of the present disclosure, which will not be repeated herein for the sake of conciseness.

In an implementation, the chip may be applied to the mobile terminal/terminal device in the embodiments of the present disclosure, and the chip may implement corresponding processes implemented by the mobile terminal/terminal device in each of the methods of the embodiments of the present disclosure, which will not be repeated herein for the sake of conciseness.

It should be understood that the chip referred to in the embodiments of the present disclosure may also be referred to as a system-on-chip, a system chip, a chip system, a system-on-a-chip, or the like.

Figure 8:
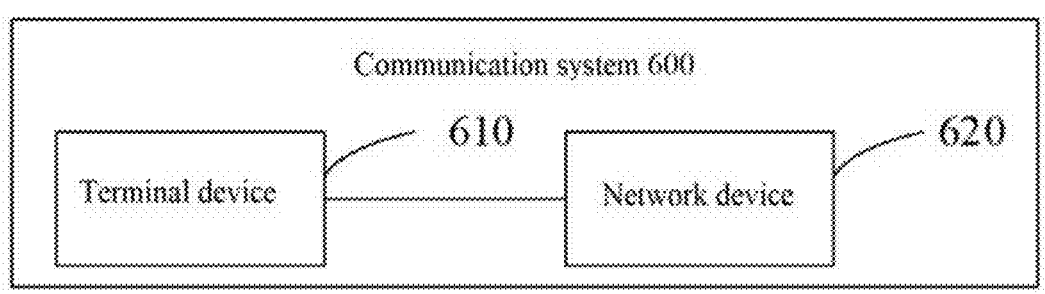
FIG. 8 is a schematic block diagram of a communication system according to an embodiment of the present disclosure.

FIG. 8 is a schematic block diagram of a communication system 600 according to an embodiment of the present disclosure. As shown in FIG. 8, the communication system 60M includes a terminal device 610 and a network device 620.

Here, the terminal device 610 may be configured to implement corresponding functions implemented by the terminal device in the abovementioned method, and the network device 620 may be configured to implement corresponding functions implemented by the network device in the abovementioned method, which will not be repeated herein for the sake of conciseness.

It should be understood that the processor according to the embodiments of the present disclosure may be an integrated circuit chip with signal processing capabilities. In a process of implementation, the steps of the abovementioned method embodiments may be accomplished by integrated logic circuitry in the hardware in a processor or by instructions in the form of software. The abovementioned processor may be a universal processor, a digital signal processor (Digital Signal Processor, DSP), an disclosure specific integrated circuit (Disclosure Specific Integrated Circuit, ASIC), a field programmable gate array (Field Programmable Gate Array, FPGA) or other programmable logic devices, discrete gate or transistor logic devices, or discrete hardware components. Each of the methods, the steps and the logical block diagrams in the embodiments of the present disclosure may be implemented or performed. The universal processor may be a microprocessor, or the processor may also be any conventional processor, or the like. The steps of the method disclosed in combination with the embodiments of the present disclosure may be directly embodied as performed by a hardware decode processor, or performed by a combination of hardware and software modules in a decode processor. The software module may be located in a storage medium proven in the art, such as a random memory, a flash memory, a read-only memory, a programmable read-only memory or an electrically rewritable programmable memory, a register, or the like. The storage medium is located in a memory, and a processor reads information in the memory and implements steps of the abovementioned method in combination with its hardware.

It can be understood that the memory in the embodiments of the present disclosure may be a volatile memory or a non-volatile memory, or may include both volatile and non-volatile memories. In that case, the non-volatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM), or a flash memory. The volatile memory may be a random access memory (Random Access Memory, RAM), which is used as an external cache. By way of illustration, but not limitation, many forms of RAM may be used, such as a static RAM (Static RAM, SRAM), a dynamic RAM (Dynamic RAM, DRAM), a synchronous DRAM (Synchronous DRAM, SDRAM), a double data rate SDRAM (Double Data Rate SDRAM, DDR SDRAM), an enhanced SDRAM (Enhanced SDRAM, ESDRAM), a synchlink DRAM (Synchlink DRAM, SLDRAM) and a direct rambus RAM (Direct Rambus RAM, DR RAM). It should be noted that the memories of the systems and methods described herein are intended to include, but are not limited to, these and any other suitable types of memories.

It should be understood that, the abovementioned memories are illustratively but not restrictively described. For example, the memory in the embodiments of the present disclosure may also be a static RAM (static RAM, SRAM), a dynamic RAM (dynamic RAM, DRAM), a synchronous DRAM (synchronous DRAM, SDRAM), a double data rate SDRAM (double data rate SDRAM, DDR SDRAM), an enhanced SDRAM (enhanced SDRAM, ESDRAM), a synchronous link DRAM (synchronous link DRAM, SLDRAM), and a direct rambus RAM (Direct Rambus RAM, DR RAM), or the like. That is, the memories in the embodiments of the present disclosure are intended to include, but are not limited to, these and any other suitable types of memories.

The embodiments of the present disclosure also provide a computer readable storage medium, configured to store a computer program.

In an implementation, the computer readable storage medium may be applied to a network device in the embodiments of the present disclosure, and the computer program enables a computer to perform corresponding processes implemented by the network device in each of the methods of the embodiments of the present disclosure, which will not be repeated herein for the sake of conciseness.

In an implementation, the computer readable storage medium may be applied to a mobile terminal/terminal device in the embodiments of the present disclosure, and the computer program enables a computer to perform corresponding processes implemented by the mobile terminal/terminal device in each of the methods of the embodiments of the present disclosure, which will not be repeated herein for the sake of conciseness.

The embodiments of the present disclosure also provide a computer program product comprising computer program instructions.

In an implementation, the computer program product may be applied to a network device in the embodiments of the present disclosure, and the computer program instructions enable a computer to perform corresponding processes implemented by the network device in each of the methods of the embodiments of the present disclosure, which will not be repeated herein for the sake of conciseness.

In an implementation, the computer program product may be applied to a mobile terminal/terminal device in the embodiments of the present disclosure, and the computer program instructions enable a computer to perform corresponding processes implemented by the mobile terminal/terminal device in each of the methods of the embodiments of the present disclosure, which will not be repeated herein for the sake of conciseness.

The embodiments of the present disclosure also provide a computer program.

In an implementation, the computer program may be applied to a network device in the embodiments of the present disclosure, and when being run on a computer the computer program, the computer program enables a computer to perform corresponding processes implemented by the network device in each of the methods of the embodiments of the present disclosure, which will not be repeated herein for the sake of conciseness.

In an implementation, the computer program may be applied to a mobile terminal/terminal device in the embodiments of the present disclosure, and when being run on the computer, the computer program enables a computer to perform corresponding processes implemented by the mobile terminal/terminal device in each of the methods of the embodiments of the present disclosure, which will not be repeated here for the sake of conciseness.

A person having ordinary skill in the art understands that each of the units and algorithmic steps illustratively described in combination with the embodiments disclosed herein can be realized by electronic hardware or a combination of computer software and electronic hardware. Whether the functions implemented in hardware or software depends on specific disclosures and design requirements for technical solutions. A person having ordinary skill in the art may use different ways to implement the described functions for each specific disclosure while such implementations should not be considered as going beyond the scope of the present disclosure.

It can be clearly recognized by a person having ordinary skill in the art that reference can be made to corresponding process in the previously mentioned embodiments of methods for specific working processes of the abovementioned system, device, and unit, which will not be repeated for easy description and conciseness.

It shall be understood that the disclosed system, device, and method in the embodiments provided in the present disclosure may be implemented in other ways. For example, the abovementioned embodiments of devices are illustrative only. For example, the division of the units is merely based on logical functions while other divisions exist in actual implementations. For example, a plurality of units or components may be combined or integrated into another system, or some features may be omitted or skipped. On the other hand, the displayed or discussed mutual coupling, direct coupling, or communicative connection may be indirect coupling or communicative connection through some ports, devices, or units and may be electrical, mechanical, or in other forms.

The units illustrated as separating components may be or not be physically separated. The components displayed as units may be or not be physical units, that is, may be located in one place, or may be distributed on a plurality of network units. Some or all of the units therein may be selected according to practical requirements for the purposes of the solutions of the embodiments.

Moreover, each of the functional units in each of the embodiments of the present disclosure may be integrated in one processing unit or be physically independent, or two or more than two units may be integrated in one processing unit.

If the functions are implemented as a software function unit, and used and sold as an independent product, it can be stored in a computer readable storage medium. Based on this understanding, the technical solution of the present disclosure may be essentially or partially embodied in the form of a software product. Or, a part of the technical solutions beneficial to the conventional technology may be embodied in the form of a software product. The computer software product is stored in a storage medium, including a plurality of instructions for a computer device (which may be a personal computer, a server, or a network device) to execute all or some of the steps of the methods described in the embodiments of the present disclosure. The previously mentioned storage medium includes a USB disk, a mobile hard disk, a read-only memory (Read-Only Memory, ROM), a random access memory (Random Access Memory, RAM), a floppy disk, an optical disk or other kinds of media capable of storing program codes.

The abovementioned is only specific implementations of the present disclosure, however, the protection scope of the disclosure is not limited thereto. Any person skilled in the art can easily think of variations or substitutions within the technical scope disclosed in the present disclosure, which should be covered in the protection scope of the present disclosure. Therefore, the protection scope of the present disclosure shall be subject to the protection scope of the claims.

What is claimed is:

1. A method for sidelink data transmission, comprising:
when a terminal device determines, according to first configuration information, to receive a first sidelink transmission channel on a target transmission resource, and determines, according to second configuration information to transmit a second sidelink transmission channel on the target transmission resource, receiving; the first sidelink transmission channel or transmitting the second sidelink transmission channel on the target transmission resource, by the terminal device, according to a first rule;
wherein the first rule is; receiving the first sidelink transmission channel or transmitting the second sidelink transmission channel on the target transmission resource, by the terminal device, according to a comparison result of first parameter information of to-be-received data on the first sidelink transmission channel and second parameter information of to-be-transmitted data on the second sidelink transmission channel;
wherein the first parameter information is priority information of the to-be-received data, and the second parameter information is priority information of the to-be-transmitted data;
wherein the receiving the first sidelink transmission channel or transmitting the second sidelink transmission channel on the target transmission resource, by the terminal device, according to a comparison result of first parameter information of to-be-received data on the first sidelink transmission channel and second parameter information of to-be-transmitted data on the second sidelink transmission channel comprises:
receiving, by the terminal device, the first sidelink transmission on the target transmission resource when a priority of the to-be-received data is higher than a priority of the to-be-transmitted data; or
transmitting, by the terminal device, the second sidelink transmission channel on the target transmission resource when a priority of the to-be-received data is lower than a priority of the to-be-transmitted data.

2. The method according to claim 1, wherein
the first sidelink transmission channel is a first physical sidelink feedback channel (PSFCH) corresponding to first sidelink data, and the second sidelink transmission channel is a second PSFCH corresponding to second sidelink data: or,
the first sidelink transmission channel is a first PSFCH corresponding to the first sidelink data, and the second sidelink transmission channel is a channel for transmitting the second sidelink data; or,
the first sidelink transmission channel is a channel for receiving the first sidelink data, and the second sidelink transmission channel is a second PSFCH corresponding to the second sidelink data.

3. A microchip, comprising:
integrated circuits forming one or more processors, which, when executing a computer program, enable a device installed with the microchip to perform the method for sidelink data transmission according to claim 1.

4. The method according to claim 1, wherein the target transmission resource is a time-domain resource.

5. The method according to claim 1, wherein a type of the first sidelink transmission channel or a type of the second sidelink transmission channel is any one of the following: a physical sidelink control channel (PSCCH), a physical sidelink shared channel (PSSCH), a physical sidelink broadcast channel (PSBCH) and a PSFCH.

6. A terminal device, comprising:
a processor, a memory and a transceiver,
wherein the memory is configured to store a computer program, and the program, when executed by the processor, causes the terminal device to:
receive a first sidelink transmission channel or transmit a second sidelink transmission channel on a target transmission resource according to a first rule when the processor determines, according to first configuration information, to receive the first sidelink transmission channel on the target transmission resource, and determines, according to the second configuration information, to transmit the second sidelink transmission channel on the target transmission resource;
wherein the first rule is: receiving the first sidelink transmission channel or transmitting the second sidelink transmission channel on the target transmission resource by the transceiver according to a comparison result of first parameter information of to-be-received data on the first sidelink transmission channel and second parameter information of to-be-transmitted data on the second sidelink transmission channel;
wherein the first parameter information is priority information of the to-be-received data, and the second parameter information is priority information of the to-be-transmitted data;
wherein the transceiver is further configured to:
receive the first sidelink transmission channel on the target transmission resource when a priority of the to-be-received data is higher than a priority of the to-be-transmitted data; or
transmit the second sidelink transmission channel on the target transmission resource when a priority of the to-be-received data is lower than a priority of the to-be-transmitted data.

7. The terminal device according to claim 6, wherein
the first sidelink transmission channel is a first physical sidelink feedback channel (PSFCH) corresponding to first sidelink data, and the second sidelink transmission channel is a second PSFCH corresponding to second sidelink data; or,
the first sidelink transmission channel is a first PSFCH corresponding to the first sidelink data, and the second sidelink transmission channel is a channel for transmitting the second sidelink data; or,
the first sidelink transmission channel is a channel for receiving the first sidelink data, and the second sidelink transmission channel is a second PSFCH corresponding to the second sidelink data.

8. The terminal device according to claim 6, wherein the target transmission resource is a time-domain resource.

9. The terminal device according to claim 6, wherein a type of the first sidelink transmission channel or a type of the second sidelink transmission channel is any one of the following: a physical sidelink control channel (PSCCH), a physical sidelink shared channel (PSSCH), a physical sidelink broadcast channel (PSBCH) and a PSFCH.

10. A non-transitory computer readable storage medium, configured to store a computer program, wherein when executed by a processor in a terminal device, the computer program causes the terminal device to:
receive a first sidelink transmission channel or transmit a second sidelink transmission channel on a target transmission resource according to a first rule when the terminal device determines, according to first configuration information, to receive the first sidelink transmission channel on the target transmission resource, and determines, according to the second configuration information, to transmit the second sidelink transmission channel on the target transmission resource;

wherein the first rule is: receiving the first sidelink transmission channel or transmitting the second sidelink transmission channel on the target transmission resource, by the terminal device, according to a comparison result of first parameter information of to-be-received data on the first sidelink transmission channel and second parameter information of to-be-transmitted data on the second sidelink transmission channel;

wherein the first parameter information is priority information of the to-be-received data, and the second parameter information is priority information of the to-be-transmitted data;

wherein the terminal device is further configured to:

receive the first sidelink transmission channel on the target transmission resource when a priority of the to-be-received data is higher than a priority of the to-be-transmitted data; or transmit the second sidelink transmission channel on the target transmission resource when a priority of the to-be-received data is lower than a priority of the to-be-transmitted data.

11. The non-transitory computer readable storage medium according to claim 10, wherein the target transmission resource is a time-domain resource.

12. The non-transitory computer readable storage medium according to claim 9, wherein a type of the first sidelink transmission channel or a type of the second sidelink transmission channel is any one of the following: a physical sidelink control channel (PSCCH), a physical sidelink shared channel (PSSCH), a physical sidelink broadcast channel (PSBCH) and a PSFCH.

13. The non-transitory computer readable storage medium according to claim 6, wherein the first sidelink transmission channel is a first physical sidelink feedback channel (PSFCH) corresponding to first sidelink data, and the second sidelink transmission channel is a second PSFCH corresponding to second sidelink data; or, the first sidelink transmission channel is a first PSFCH corresponding to the first sidelink data, and the second sidelink transmission channel is a channel for transmitting the second sidelink data; or, the first sidelink transmission channel is a channel for receiving the first sidelink data, and the second sidelink transmission channel is a second PSFCH corresponding to the second sidelink data.

* * * * *